2,780,443
Patented Feb. 5, 1957

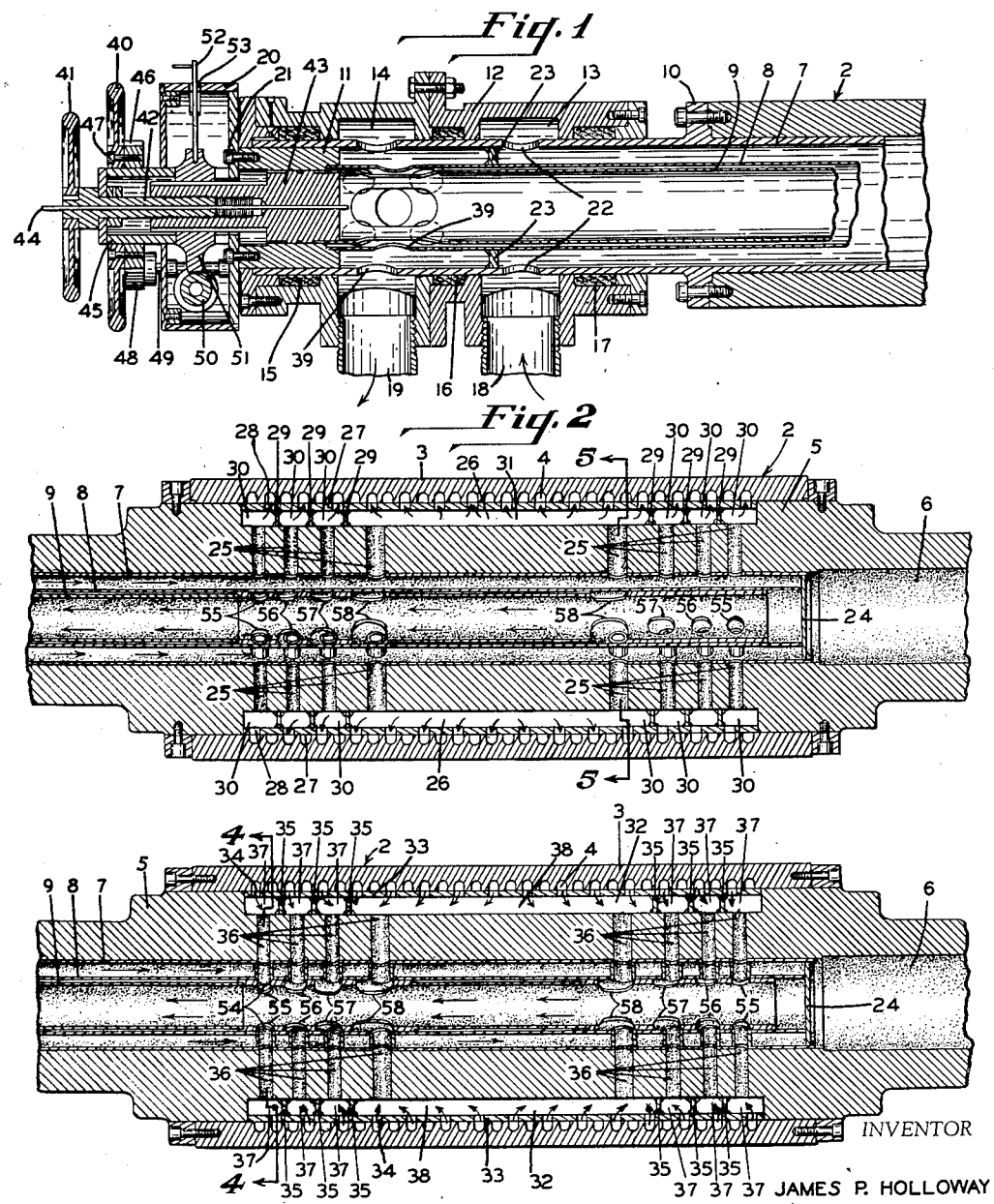
Feb. 5, 1957 — J. P. HOLLOWAY — 2,780,443
CALENDER ROLL
Filed Dec. 15, 1953 — 2 Sheets-Sheet 1
INVENTOR
JAMES P. HOLLOWAY
ATTORNEY Feb. 5, 1957  J. P. HOLLOWAY  2,780,443
CALENDER ROLL
Filed Dec. 15, 1953  2 Sheets-Sheet 2
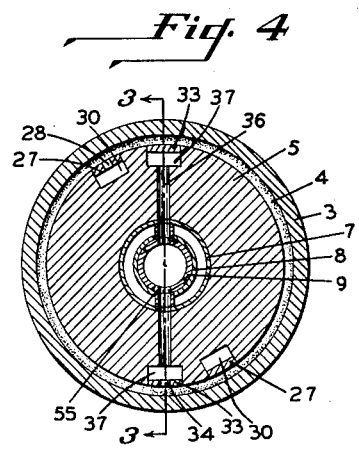
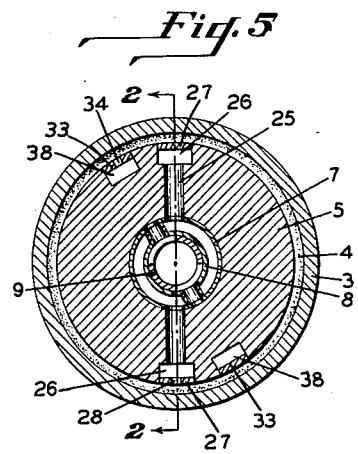
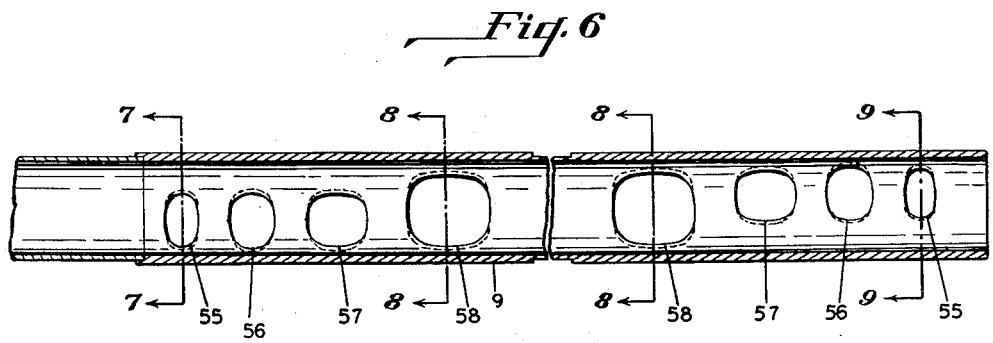
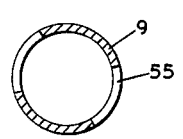
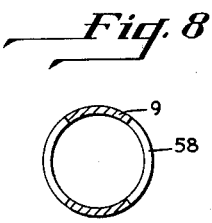
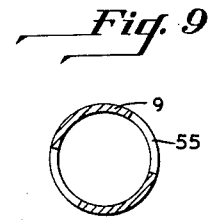
INVENTOR
JAMES P. HOLLOWAY
ATTORNEY

United States Patent Office

2,780,443

CALENDER ROLL

James P. Holloway, Manheim Township, Lancaster County, Pa., assignor to Armstrong Cork Company, Lancaster, Pa., a corporation of Pennsylvania Application December 15, 1953, Serial No. 398,359

7 Claims. (Cl. 257—95)

In the operation of sheeting calenders such as those currently used in the manufacture of floor and wall coverings, it is highly desirable to control the temperature on the surface of the roll within a very limited range in order to produce sheet material having the desired surface characteristics and the desired design effect.

One type of roll used for this purpose in calendering thermoplastic materials is disclosed in United States Patent No. 2,498,662, issued February 28, 1950. The roll disclosed in this patent has a relatively thin outer shell provided with a plurality of annular channels disposed immediately beneath the working surface of the roll. The purpose of this arrangement of annular channels is to provide a system in which the temperature control fluid acts immediately on the working surface of the roll and prevents the entrapment of a large quantity of fluid in the center of the roll where it is ineffective for controlling the temperature of the working surface of the roll.

The present invention relates to a mechanism for changing the amount of temperature control fluid directed to different areas of the roll surface in accordance with specific requirements. With the system of this invention, it is possible to maintain certain areas of the roll at temperatures different from the temperatures in other areas of the roll. For example, if desired, the ends of the roll may be operated at a different temperature form the intermediate section of the roll. Also, in instances where certain areas of the roll are subject to greater temperature fluctuation due to increased heat transmission, etc., it is possible to offset this fluctuation by directing a greater or lesser amount of heat control fluid through the heat control fluid passages in these areas. The system is, therefore, effective to maintain certain areas of the roll surface at different temperatures where the normal temperature of the roll surface is constant; or it may be used to maintain a constant temperature at all points on the roll surface when the normal temperature of the roll surface is not constant.

For example, in the calendering of asphalt tile, cold brine is circulated through the top or facing roll of the calender to prevent the roll surface from getting too hot due to its constant contact with the asphalt tile composition. However, if the rate of flow or brine is the same throughout the entire roll, the ends of the roll become too cold due to increased radiation from these areas, with the result that the edges of the calendered sheet have different surface characteristics than the remainder of the sheet. To overcome this trouble caused by cold ends on the rolls, the device hereinafter disclosed has been utilized.

The system is suitable for the transfer of heating fluid or cooling fluid through the roll, depending on the specific requirements of the product being formed into a sheet on the calender in which the roll is a component part.

An object of this invention is to provide a system whereby it is possible to control the temperature of the surface by controlling the distribution of fresh temperature control fluid within the body of the roll.

Another object of this invention is to provide a calender roll in which the rate of flow of temperature control fluid supplied to different areas of the roll can be controlled to vary the temperature of different areas of the roll at any given time.

In order that this invention may be more readily understood, it will be described in connection with the attached drawings, in which:

Figure 1 is a longitudinal cross-sectional view of the injector and discharge end of the roll showing the controls, indicators, etc.;

Figure 2 is a longitudinal sectional view of a calender roll on the line 2—2 of Figure 5 showing the internal passages for the introduction of temperature control fluid to the annular passages adjacent to the surface of the roll;

Figure 3 is a longitudinal sectional view of the roll on the line 3—3 of Figure 4 showing the arrangement of fluid passages for the discharge of temperature control fluid from the roll;

Figure 4 is a cross-sectional view on the line 4—4 of Figure 3;

Figure 5 is a cross-sectional view on the line 5—5 of Figure 2;

Figure 6 is a plan view of the discharge pipe showing the arrangement of ports therein;

Figure 7 is a cross-sectional view on the line 7—7 of Figure 6;

Figure 8 is a cross-sectional view on the line 8—8 of Figure 6; and

Figure 9 is a cross-sectional view on the line 9—9 of Figure 6.

Referring to Figure 2, there is shown a calender roll 2 having a relatively thin outer shell 3 provided with a plurality of annular channels 4 formed on the inner surface thereof. This outer shell 3 surrounds a central core 5 having a longitudinal central passage 6 carrying a plurality of concentric pipes. These concentric pipes are designated by the numerals 7, 8, and 9. The core 5 fits tightly within the shell 3 and engages the upstanding ribs between adjacent annular channels 4 to seal the annular channels from one another.

Referring now to Figure 1, there is shown the neck end of the roll 2 and the concentric pipes 7, 8, and 9. It will be understood that the portion of the calender roll shown at the right-hand side of Figure 1 fits onto the left-hand side of Figures 2 and 3, as viewed in the drawing. The concentric pipes 7, 8, and 9 rotate with the calender roll 2. Outer pipe 7 fits tightly in the longitudinal passage in the core 5 of roll 2 and is also welded to a flange 10 secured to the neck of the roll 2 by means of studs. The end of outer pipe 7 is provided with a bushing 11 secured thereto. The end of intermediate pipe 8 is also secured to bushing 11. It will be clear that with this arrangement any rotation of the roll 2 will rotate outer pipe 7 and intermediate pipe 8. Certain portions of the inner pipe 9 are in frictional engagement with the interior of intermediate pipe 8, the frictional engagement being such that intermediate pipe 8 will rotate inner pipe 9 with it during normal operation. However, inner pipe 9 may be moved both longitudinally and radially with respect to intermediate pipe 8 in a manner to be described later.

Between the left-hand end of the roll 2 and the end of outer pipe 7, there is positioned a housing 12 which encases two radial manifolds 13 and 14. These radial manifolds are sealed against leakage by means of packing glands 15, 16, and 17. Radial manifold 13 is connected to an inlet supply pipe 18 while radial manifold 14 is connected to a discharge pipe 19. It will be understood that the housing 12 is stationary and that the concentric pipes 7, 8, and 9 rotate therein.

At the extreme left-hand end of Figure 1 are the controls and indicators for controlling the discharge of the fluid from the calender roll. These controls are mounted on a housing 20 secured by means of studs 21 to the bushing 11. With this arrangement the controls rotate with the calender roll 2. The actual operation of the controls and indicators is hereinafter described.

The temperature control fluid enters the system through the supply pipe 18 into manifold 13. This fluid is supplied under pressure by a pump or other suitable means not shown. Radial manifold 13 communicates with the outer concentric pipe 7 by means of ports 22 formed in the wall of the pipe 7. Passage of temperature control fluid between the two manifolds 13 and 14 in pipe 7 is prevented by means of a dam 23 positioned between the inner surface of outer pipe 7 and the outer surface of intermediate pipe 8. The temperature control fluid introduced under pressure to pipe 7 through the ports 22 flows along the pipe into the center of the roll cavity. The other end of the pipe 7 is closed by means of a plate 24 which seals off the end of outer pipe 7 and the end of intermediate pipe 8.

Positioned in the core 5 are radial passages 25 (Figure 2) which extend from the longitudinal central cavity of the roll to longitudinal inlet manifolds 26 positioned immediately beneath the outer shell 3. These radial passages 25 are in communication with the interior of pipe 7 by means of orifices in the pipe 7 in register with the radial passages 25. It will be noted in Figure 2 that there are two sets of radial passages 25 and two longitudinal inlet manifolds 26. With this arrangement the temperature control fluid in pipe 7 will flow through both sets of radial passages 25 to longitudinal manifolds 26 positioned at opposite points on the circumference of the core 5. These two sets of radial passages 25 are disposed at 180° to one another and the longitudinal inlet manifolds 26 are disposed at 180° to one another. The longitudinal inlet manifolds 26 are sealed off from the annular channels 4 in the outer shell of the roll by means of shields 27 positioned on the circumference of the cylindrical core 5. These shields 27 are provided with apertures 28 which permit the temperature control fluid in the longitudinal manifolds 26 to flow through the apertures 28 into the annular channels 4. Each longitudinal inlet manifold 26 is divided into a plurality of compartments by means of dams 29. These dams 29 are so arranged that three small compartments 30 are provided at each end of each manifold while the central part of the manifold comprises one large compartment 31. The compartments are so arranged that each of the small compartments 30 is positioned adjacent two annular channels 4. It will be noted that each of the longitudinal inlet manifolds 26 communicates with only one-half of the annular channels 4. That is, the longitudinal inlet manifold at the top of the roll communicates with alternate annular channels 4 while the corresponding manifold at the bottom of the roll communicates with alternate annular channels which are intermediate the annular channels supplied by the first manifold.

Referring to Figure 2, it will be observed that the fluid enters the first annular channel on the left-hand side of Figure 2 from the end compartment 30 of the bottom longitudinal inlet manifold 26, and the second annular channel is supplied with fluid from the end compartment 30 of the top longitudinal inlet manifold 26. From this it is seen that each of the small compartments 30 supplies fluid to only one annular channel, while the central compartment 31 supplies the remainder of the channels.

The radial passages 25 are so arranged that one passage is provided for each of the small end compartments 30, while two are provided for each of the larger central compartments 31.

As the temperature control fluid is forced through the apertures 28, the stream of fluid divides, with the result that a portion of the fluid flows around the roll in one direction and the remainder of the fluid flows around the roll in the other direction. These two fluid streams meet in the annular channel 4 at a point approximately 180° from the point at which the fluid was introduced into the annular channel through the aperture 28. The fluid is discharged from the annular channels through the system shown in Figure 3.

In Figure 3, there are shown two longitudinal exhaust manifolds 32 positioned immediately beneath the shell 3. These exhaust manifolds are in the same relative position as the longitudinal inlet manifolds 26 except that they are angularly displaced from the longitudinal inlet manifolds 26 on the circumference of the core 5. The relationship between the position of the longitudinal exhaust manifolds 32 and the longitudinal inlet manifolds 26 is clearly illustrated in Figures 4 and 5. The longitudinal exhaust manifolds 32 are provided with shields 33 separating them from the annular channels 4. These shields 33 are provided with apertures 34 communicating with the annular channels 4. In comparing Figure 2 and Figure 3, it will be observed that the fluid enters the first annular channel on the left-hand side of Figure 2 from the bottom longitudinal inlet manifold 26 and is discharged from the first annular channel on the left-hand side into the top longitudinal exhaust manifold 32 in Figure 3. Since the longitudinal inlet manifold 26 is positioned immediately beside the longitudinal exhaust manifold 32, it will be seen that the discharge takes place at approximately 180° from the point at which the fluid enters the annular channel 4. The same system of alternate exhaust manifolds communicating with alternate annular channels is used in the discharge system illustrated in Figure 3 as is above explained in connection with the supply system illustrated in Figure 2.

Each longitudinal exhaust manifold 32 is divided into a plurality of compartments by means of dams 35. The compartments in the exhaust manifolds 32 correspond in size and position to the compartments 30 and 31 in the inlet manifolds, the small end compartments being designated by the numeral 37 and the larger middle compartments being designated by the numeral 38. The fluid is conducted from the longitudinal exhaust manifolds 32 through radial passages 36 leading through the core 5 to inner pipe 9. Each of the end compartments 37 of the exhaust manifolds has one radial passage 36, while the middle exhaust compartments 38 are provided with two radial passages. The discharged fluid passes through the radial passages 36 into the inner pipe 9 through which it is conducted to the left, as shown in Figure 3, until it reaches the end of pipe 9, as shown in Figure 1. The ends of inner pipe 9, intermediate pipe 8, and outer pipe 7 are provided with outlet ports 39 communicating with radial manifold 14, which in turn communicates with discharge pipe 19.

In the system just described, if all fluid passages, manifolds, apertures, and channels are unrestricted, all the annular channels 4 will carry the same quantity of temperature control fluid flowing at substantially the same velocity. However, the passage of fluid through certain of the annular channels of the roll may be impeded by shutting off or partially shutting off certain of the radial exhaust passages 36. If this is done, temperature control fluid will be entrapped in certain annular channels 4 and at the same time will be permitted to flow freely through other annular channels of the roll.

The restriction of the passage of the fluid is accomplished by adjusting the position of the inner pipe 9 with respect to intermediate pipe 8. This adjustment may be made by moving the pipe 9 longitudinally with respect to pipe 8 and also turning pipe 9 radially with respect to pipe 8. As explained earlier, pipe 8 rotates with calender roll 2, while pipe 9 normally rotates with calender roll 2 but may, during adjustment, be rotated with respect to pipe 8. This adjustment of pipe 9 with respect to pipe 8 is accomplished by means of two handwheels 40 and 41 positioned on the left-hand side of Figure 1. Handwheel 41 is keyed to a screw shaft 42 which is threaded into a plug 43 secured to the end of inner pipe 9. Rotation of the handwheel 41 will move pipe 9 in a longitudinal direction, inasmuch as handwheel 41 is so mounted as to prevent lateral movement thereof with respect to pipe 8. The amount of movement of pipe 9 is indicated by an indicator rod 44 attached to the end of pipe 9 and extending through a central bore in plug 43, screw shaft 42, and handwheel 41. By means of this indicator, the exact longitudinal position of pipe 9 will be known at all times. Pipe 9 may be rotated with respect to pipe 8 by means of handwheel 40 which rotates about hub 45. This handwheel 40 carries a gear 46 secured thereto by means of studs 47. Gear 46 engages a spur gear 48 keyed to a shaft 49. Shaft 49, by means of suitable gearing, rotates worm 50, which in turn rotates worm wheel 51 keyed to the plug 43. Worm wheel 51 is keyed to plug 43 in such manner that the plug can move longitudinally during longitudinal adjustment of the pipe 9. Attached to worm wheel 51 is an indicator rod 52 extending in an upwardly direction through an opening 53 in the housing 20. The position of this indicator rod 52 shows the amount of angular displacement of pipe 9 with respect to pipe 8.

Referring now to Figure 3, it will be seen that the intermediate pipe 8 is provided with orifices 54 communicating with radial exhaust passages 36. These orifices are the same size and shape as the cross-sectional dimensions of the radial exhaust passages 36. Inner pipe 9 is provided with larger orifices 55, 56, 57, and 58, which are in register with orifices 54 in intermediate pipe 8 during normal operation in which the flow of fluid is unrestricted at all points. The orifices in the inner pipe 9 are not all the same size and shape as the orifices 54 in the intermediate pipe 8. It will be observed that the orifices 55, which are in register with radial passages 36 at the ends of the roll, are the same dimension lengthwise of the pipe as the hole 54 in the intermediate pipe 8. Progressing from these end passages toward the center of the roll it will be seen that orifices 56, which are in register with the second pair of radial exhaust passages 36, are fifty percent larger than the size of the orifices 54 in the intermediate pipe 8. Since the orifices 54 in register with the radial passages 36 at each end of the roll are all the same size, it will be obvious that the orifice 56 is fifty percent larger than the orifice 55.

Progressing to the next set of radial passages 36, the orifice 57 in the inner pipe 9 is one hundred percent larger than the orifice 54 in intermediate pipe 8. This arrangement of different sized orifices in the inner pipe 9 is the same at each end of the roll.

With this system, if inner pipe 9 is moved longitudinally with respect to intermediate pipe 8 a distance equal to one-half the diameter of the orifices 54, it will be seen that the end radial passages will be half closed while all the other radial passages will be fully open. This will restrict the flow of fluid from the end channels of the roll and will, therefore, have a decreased cooling effect on the ends of the roll. Movement of the inner pipe 9 another half diameter of the orifice 54 will completely shut off the end radial passages and will half close the second set of radial passages. With this setting, no cooling fluid is flowing from the end channels and flow is restricted in the second set of two channels communicating with the second end compartment. Continued movement of the inner pipe 9 to the right as viewed in the drawing will completely close the second radial passage and half close the third radial passage, thereby entrapping fluid in the four end channels and restricting the flow in the fifth and sixth channels. Movement of the inner pipe 9 another one-half diameter will completely close all of the annular channels leading from the small compartments in the end of the roll, but the inner radial passages will remain open.

If it should be desired to shut off the flow of temperature control fluid from one end of the roll and maintain it at the other end of the roll, this can be accomplished by rotating inner pipe 9 with respect to intermediate pipe 8. It will be noted that the orifices 55, 56, and 57 at one end of the inner pipe 9 are angularly displaced with respect to the orifices 55, 56, and 57 at the other end of the pipe. With this arrangement, if it is desired to shut off the flow of temperature control fluid through the right-hand end of the roll, as viewed in Figure 3, inner pipe 9 is rotated in a clockwise direction by rotation of the handwheel 40. This will close all of the annular passages at the right-hand end of the roll, while all of the annular passages at the left-hand end of the roll will remain open. Should it be found desirable to shut off the annular passages at the left-hand end of the roll and keep the passages at the right-hand end of the roll open, the inner pipe is rotated in a counterclockwise direction. It will be understood that the rotation and longitudinal movement of the inner pipe 9 can be carried out at the same time so as to completely shut off the annular passages at one end of the roll and partially close annular passages at the other end of the roll, as described earlier, by moving the pipe longitudinally with respect to the annular passages.

In the operation of the device, the calender roll is operated with temperature control fluid flowing through all portions at substantially the same velocity, with all the ports between the radial passages and the inner pipe 9 open. If it is found that the ends of the roll are being cooled to too great an extent by the cooling fluid, this can be corrected by moving inner pipe 9 a sufficient omunt to close off as many of the end channels as may be found desirable to maintain the ends of the roll at the proper temperature.

In the system here under consideration, the temperature is controlled by impending the flow of fluid from the annular channels, thereby entrapping the fluid therein. It will be understood, however, that the system may be used to impede the supply of fluid to the annular channels 4. This is accomplished by supplying temperature control fluid through pipe 19 into inner pipe 9 and discharging the fluid from the roll through pipe 7 to pipe 18.

With a system of this type, it is possible to circulate temperature control fluid through the entire roll and control the circulation so as to entrap temperature control fluid in one area of the roll to change the temperature of that area with respect to the other areas of the roll. This is all accomplished by impeding the flow of the exhaust fluid from the annular channels positioned immediately beneath the working surface of the roll.

I claim:

1. In a heat exchange roll of the shell type, comprising an outer shell and an inner core with a temperature control fluid circulating system disposed therebetween to control the temperature of the roll surface, means for dividing the temperature control fluid circulating system into zones, each zone comprising a plurality of annular channels, and means for controlling the rate of flow of fluid so that the fluid will flow at a different rate in adjacent zones.

2. In a heat exchange roll of the shell type, comprising an outer shell and an inner core with a temperature control fluid circulating system disposed therebetween to control the temperature of the roll surface, means for dividing the temperature control fluid circulating system into zones, said inner core being provided with a longitudinal central cavity for the introduction of temperature control fluid into the roll, means for transferring the temperature control fluid from the central cavity to individual groups of annular channels comprising the circulating system, means for returning the fluid from the annular channels to the central cavity, and control means to regulate the rate of flow so that fluid will flow at a different rate in adjacent zones.

3. In a heat exchange roll of the shell type, comprising an outer shell and an inner core with a temperature control fluid circulating system disposed therebetween to control the temperature of the roll surface, means for dividing the temperature control fluid circulating system into separate zones, each zone comprising a plurality of annular channels, said core being provided with a longitudinal central cavity, means for introducing temperature control fluid into said longitudinal central cavity, said core being provided with radial passages for the conduction of temperature control fluid from the longitudinal central cavity to the individual zones of the temperature control fluid circulating system, said core also being provided with radial passages for conducting the temperature control fluid from the individual zones of the temperature control fluid circulating system back to the central cavity, and means for controlling the rate of flow of fluid so that fluid will flow at a different rate in adjacent zones.

4. In a heat exchange roll of the shell type, comprising an outer shell and an inner core with a temperature control fluid circulating system disposed therebetween to control the temperature of the roll surface, means for dividing the temperature control fluid circulating system into zones along the length of the roll, said core being provided with a longitudinal cavity for the introduction of temperature control fluid thereto, said core being provided with radial passages for transmitting temperature control fluid from the central cavity to the individual zones in the circulating system, said core being provided with a second set of radial passages for transmission of discharged temperature control fluid from the individual zones of the circulating system to the roll cavity, and a pair of concentric pipes communicating with the radial exhaust passages for conducting the temperature control fluid away from the central cavity, said concentric pipes being movable with respect to one another to control the rate of flow of temperature control fluid through separate zones to vary the temperature of different zones on the surface of the roll.

5. In a heat exchange roll of the shell type, comprising an outer shell and an inner core with temperature control fluid circulating system disposed therebetween to control the temperature of the roll surface, means for dividing the temperature control fluid circulating system into zones along the length of the roll, said core being provided with a longitudinal central cavity for the introduction of temperature control fluid, said core being provided with radial passages for conducting the fluid from the central cavity to each zone of the temperature control fluid circulating system, said core also being provided with radial passages for the transmission of discharged temperature control fluid from each individual zone of the temperature control fluid circulating system to the central cavity, a pair of concentric pipes connected to said radial discharge passages for conducting temperature control fluid away from the roll, each of said pipes being provided with orifices in alignment with said discharge passages in said core, and means for moving one of said pipes longitudinally with respect to the other of said pipes to progressively change the rate of flow in adjacent zones on the surface of the roll, said progression moving sequentially from the ends of the roll toward the center.

6. In a heat exchange roll of the shell type, comprising an outer shell and an inner core with a temperature control fluid circulating system disposed therebetween to control the temperature of the roll surface, means for dividing the temperature control fluid circulating system into zones along the length of the roll, said core being provided with a longitudinal central cavity for the introduction of temperature control fluid thereto, said core being provided with radial passages leading from said central cavity to each individual zone of the temperature control fluid circulating system to conduct temperature control fluid from the central cavity to each individual zone of the temperature control fluid circulating system, said core also being provided with radial passages leading from the individual zones to the longitudinal central cavity to conduct discharged temperature control fluid from the individual zones to the longitudinal central cavity to conduct discharged temperature control fluid from the individual zones to the central cavity, and a pair of concentric pipes located in said central cavity and connected with said discharge passages, one of said concentric pipes being rotatable with respect to the other concentric pipe, each of said pipes being provided with orifices to register with orifices in the other pipe, the arrangement of orifices between the concentric pipes and the radial exhaust passages being such that rotation of the pipe in one direction will restrict the rate of flow of temperature control fluid through the zones at one end of the roll and rotation of the pipe in the other direction will restrict the flow of temperature control fluid through the zones at the other end of the roll.

7. In a heat exchange roll of the shell type, comprising an outer shell and an inner core with a temperature control fluid circulating system disposed therebetween to control the temperature of the roll surface, means for dividing the temperature control fluid circulating system into zones along the entire length of the roll, said core being provided with a longitudinal central cavity, said core being provided with two sets of radial passages for connecting said central cavity with each individual zone of the temperature control fluid circulating system, a pair of concentric pipes in said longitudinal central cavity, said concentric pipes being in communication with one set of radial passages communicating with each zone in the temperature control fluid circulating system, each of said pipes being provided with orifices in alignment with one set of radial passages, and means for moving one of said pipes longitudinally with respect to the other pipe to progressively change the rate of flow in adjacent zones on the surface of the roll, said progression moving sequentially from the ends of the roll toward the center.

References Cited in the file of this patent

UNITED STATES PATENTS

| 1,016,382 | Weeden | Feb. 6, 1912 |
| 1,739,787 | Doughty et al. | Dec. 17, 1929 |
| 1,928,173 | Gerstenberg | Sept. 26, 1933 |
| 2,435,959 | Eaby | Feb. 17, 1948 |
| 2,498,662 | Eaby | Feb. 28, 1950 |

FOREIGN PATENTS

| 253,331 | Switzerland | Nov. 16, 1948 |